United States Patent [19]

Rusincovitch, Jr.

[11] Patent Number: 5,304,411
[45] Date of Patent: Apr. 19, 1994

[54] CHEMICAL EMBOSSED POLYVINYL CHLORIDE FILM

[75] Inventor: George Rusincovitch, Jr., Worthington, Ohio

[73] Assignee: Borden, Inc., Columbus, Ohio

[21] Appl. No.: 882,509

[22] Filed: May 13, 1992

[51] Int. Cl.⁵ ............................................. B32B 3/26
[52] U.S. Cl. ............................... 428/141; 428/447; 428/483; 428/522; 428/142; 428/145; 428/147; 428/151; 428/331; 524/773
[58] Field of Search ............... 428/141, 483, 447, 522, 428/142, 145, 147, 151, 331; 427/340; 524/773, 377

[56] References Cited

U.S. PATENT DOCUMENTS

| | | | |
|---|---|---|---|
| 3,811,915 | 5/1974 | Burrell et al. | 117/45 |
| 4,343,839 | 8/1982 | Blegen | 427/340 |
| 4,365,039 | 12/1982 | Blegen | 524/773 |
| 4,368,222 | 1/1983 | Blegen et al. | 427/340 |
| 4,374,167 | 2/1983 | Blegen | 428/141 |
| 4,532,157 | 7/1985 | Schmidt et al. | 427/262 |
| 4,735,827 | 1/1988 | Frank et al. | 427/264 |
| 5,019,202 | 5/1991 | Kawahata et al. | 156/277 |

FOREIGN PATENT DOCUMENTS

| | | | |
|---|---|---|---|
| 0115038 | 7/1985 | European Pat. Off. | B41M 3/06 |
| 59-010371 | 1/1984 | Japan | B05D 5/06 |
| 60-202767 | 10/1985 | Japan | B05D 5/06 |

OTHER PUBLICATIONS

Japanese Patent JP-297391 in Jul. 10, 1987 to Toyota Jidosha (abstract in English only).

*Primary Examiner*—Edith Buffalow
*Attorney, Agent, or Firm*—George P. Maskas; Dennis H. Rainear; Kenneth P. Van Wyck

[57] ABSTRACT

Polyvinyl chloride articles are chemically embossed by placing a pattern thereon with a composition of vinyl ink containing silicone oil wherein the quantity of silicone oil is from about 2.5% to 5% by weight of the composition and then top coating the article with a fluid coating of an aromatic-hydroxyl functional polyester and a multi-isocyanate curing agent which is cured in the presence of a vaporous tertiary amine catalyst to form an adherent film over said substrate and whereby the fluid coating retracts from over the siliconized ink prior to curing to form a concave pattern on the cured film which is in registry with the siliconized ink.

14 Claims, No Drawings

CHEMICAL EMBOSSED POLYVINYL CHLORIDE FILM

BACKGROUND OF THE INVENTION

1. Field of the Invention

This invention relates to the chemical embossing of polyvinyl chloride (PVC) articles such as those in the form of a panel, sheet or film.

2. Background Art

The traditional method to impart surface texture to PVC articles is by embossing. Illustratively, typical printed and unprinted PVC articles, e.g., films used for lamination to metal, wood, plastics, wallboard, and the like, require an embossed surface to give the film a textured look.

Embossing is normally a mechanical method by which a thermoplastic sheet is textured with a pattern imparted by an embossing roll pressed against a backup roll under controlled preheating and post cooling conditions. When it is desired to provide color contrast to the embossed area, inks are used in order to accentuate the embossing.

A problem involved with such mechanical embossing is in placing the ink in registration with the embossed areas. Such registration is difficult to accomplish, requires expensive equipment and is generally limited to small embossed patterns.

One process for obtaining registration of ink with a mechanically embossed pattern is called "spanished". In the spanished process, the PVC substrate is embossed mechanically to form valleys or depressed areas. Then, the surface is flooded with ink. The ink is subsequently squeegeed off so that it is wiped off of the hills or raised portions of the substrate but remains in the valleys. A major shortcoming of the spanished process is streaking of ink on the substrate.

In addition to mechanical embossing as described above, an embossing effect can be obtained chemically on certain substrates. Generally, chemical embossing involves adding a surface tension reducer to an ink or over a specific pattern which is printed on a substrate. A top coat is then applied so that it superimposes at least a portion of the area having the reduced surface tension. The surface tension of the top coat is selected so that it does not wet the area which has the reduced surface tension but it does wet the substrate and other portions overlying the substrate which do not have the reduced surface tension. On drying, the top coat pulls away from the area which has the reduced surface tension and leaves a valley or depression which forms the embossed area in the coating.

Many attempts to produce a desirable chemically embossed surface on PVC substrate by applicant were unsuccessful. Tests showed that compatibility was a problem as between the PVC substrate, the type of ink, the type of surface tension reducing agent, and the top coat. Thus, the ink, with or without a surface tension reducing agent, may not be compatible with the substrate or the top coat. Some surface tension reducing agents are not compatible with certain inks and some top coats are not compatible with the PVC substrate. Also, the top coat would spread unevenly in the areas of the reduced surface tension. If the surface tension of the top coat were lowered, then the top coat did not coat evenly on the PVC substrate. Finally a combination of certain inks, surface agent reducing agents and top coat was found to be operable.

A search revealed the following references which deal with chemical embossing.

U.S. Pat. No. 4,532,157 to H. Schmidt et al. of Jul. 30, 1985 relates to a process for producing colored, resin-impregnated paper sheets with a three-dimensional surface structure by printing a pattern on the paper sheets wherein the printing ink includes a lacquer repelling material in those regions where the lacquer is to be thinner than in other regions, then drying the printed sheet and finally lacquering the printed sheet.

U.S. Pat. No. 4,735,827 to J Frank et al. of Apr. 5, 1988 relates to a process for preparing a graphic pattern on a carrier having a protective coating thereon in exact registration with the pattern. The Frank et al. process comprises: applying a liquid protective coating over a graphic pattern on a carrier slightly beyond the edge definition of the pattern and in substantial registration therewith, the protective coating having sufficient surface tension to wet the graphic pattern but not the surface of the carrier. When the protective coating is dried, it dewets and retracts from the surface of the carrier onto the graphic pattern and provides exact registration therewith.

The Frank et al. process differs from the present invention in a number of ways. Thus, the entire substrate is siliconized in the above Frank et al. patent whereas the silicone is placed in the ink forming the pattern or image of the present invention; the substrate in Frank et al. is polyester and not PVC; the protective coating in Frank et al. is placed in the area of the pattern instead of over the entire surface, and the protective coating in Frank et al. does not come in contact with the substrate material.

U.S. Pat. No. 5,019,202 to I. Kawahata et al. of May 28, 1991 relates to a process for producing decorative sheets having an embossed pattern corresponding to a printed pattern layer by forming a printed pattern layer of ink and resin on base paper wherein the printing ink is liquid repellant; coating the whole surface of the printed pattern layer with top coat and then solidifying the top coat thereby forming a top coat of which the portions corresponding to the liquid repellant printed pattern layer are concave. The resin is used with the ink in order to provide strength to the paper.

Japanese patent JP-297391 of Jul. 10, 1987 to Toyota Jidosha relates to the use of a surface tension conditioner such as silicone oil which is used to form a pattern on a base material. A metallic paint is then coated over a base material and the pattern. The metallic paint which is overcoated on the surface tension conditioned layer has a different orientation from that of the metallic paint which is coated directly on to the base material.

The silicone oils of this invention are used as anti-foam agents in compositions having the same ingredients as those of this invention. However, the silicone oil for defoaming purposes is used in such small quantity, e.g., a few tenths of a percent, so that it does not provide the function of preventing wetting as in the present invention.

U.S. Pat. No. 4,343,839 of Aug. 10, 1982 and its divisional U.S. Pat. Nos. 4,365,039 and 4,374,167 of Dec. 21, 1982 and Feb. 15, 1983 respectively, all to J. R. Blegen, describe vapor permeation curable polyester resin compositions for coating flexible substrates such as PVC. The coating composition is that of certain phenolic terminated polyesters and multi-isocyanate curing agents. U.S. Pat. No. 4,368,222 of Jan. 11, 1983 which issued to J. R. Blegen et al. describes similar coating compositions of a phenolic terminated polyester and multi-isocyanates. The coating compositions of these Blegen patents and the polyester containing coatings of the Blegan et al. patent are used as the top coat in this invention and are referred to herein simply as aromatic-hydroxyl functional polyester-isocyanate top coats.

SUMMARY OF THE INVENTION

It has been found that chemical embossing on PVC substrates can be effected by: printing a pattern with a composition of vinyl ink which contains a silicone oil surface tension reducing agent; overcoating the PVC substrate with a fluid aromatic-hydroxyl functional polyester-isocyanate top coat; and finally curing the top coat in the presence of a tertiary amine. The quantity of silicone oil in the ink composition is from about 2.5% to 5% by weight of the composition. The siliconized ink prevents the top coat from wetting this inked pattern. After curing, the top coat forms an adherent film over the unsiliconized substrate but a valley or depression is left over the printed pattern since the silicone containing ink pattern is not wetted by the top coat.

The cured top coat forms a coating that has dimension or a textured effect adjacent the siliconized ink. The cured top coat adheres to the PVC substrate and any vinyl ink which is not siliconized as described herein.

The present invention provides exact registration of a tough protective top coat adjacent or surrounding the area of the siliconized ink. The protective top coat has tapered, rounded and downwardly sloping edges surrounding the siliconized ink and looks integrated with the substrate.

In another aspect, the invention involves a process for chemically embossing PVC substrates or articles. The process comprises the steps of: applying an image or pattern on the substrate with vinyl ink wherein at least a portion of the pattern is applied with a siliconized vinyl ink composition containing from about 2.5% to 5% of silicone oil. The siliconized ink is permitted to dry and then a fluid aromatic-hydroxyl functional polyester-isocyanate top coat is applied over the PVC substrate, including the dried siliconized ink. The top coat is repelled or dewets from over the siliconized ink. The coating is then exposed to a vaporous tertiary amine catalyst to cure the coating and provide a chemically embossed PVC article having a concavity which is in registration with the siliconized pattern.

DETAILED DESCRIPTION OF THE INVENTION

The main object of this invention is to create an embossed effect by use of an ink that wets out and adheres to the PVC film but repels a top coat. This top coat must also adhere to the PVC and any non-repelling ink, but be repelled by the repelling ink. It is the combination of repelling ink and top finish that creates the embossed effect.

Rigid PVC sheet or film has a critical surface tension of 38 to 40 dynes/cm at 20° C. Flexible PVC is slightly lower at 33 to 38 dynes/cm at 20° C. To properly coat or print these vinyls, a coating with a surface tension lower than that of the vinyl must be used. If the surface tension is too high, it would not be expected that the coating will wet-out properly. Therefor, inks and coatings are developed with lower surface tensions. Solvent inks and coatings used have ranged from 27.5 dynes/cm at 20° C. to 29.5 dynes/cm at 20° C. Waterbase coatings ranged from 31.4 dynes/cm to 35.4 dynes/cm at 20° C. All of these were expected to wet out the surface, creating the desired effect.

A large number of additives were tested in the vinyl ink, such as waxes, teflon, polyethylene, polypropylene, polyolefin, and silicone oil. Also, a number of of top finishes (top coats), such as acrylic, urethane, vinyl and vinyl-acrylic. Both solvent and waterborne systems were evaluated. The only combination of the vinyl ink additives and top finish that was successful was the siliconized ink with the aromatic-hydroxyl functional polyester-isocyanate top coat (cured in the presence of tertiary amine). This was unexpected because the surface tension of these two liquids was the same. Other tests with similar surface tensions had failed to produce a chemical emboss.

In this invention, the conventional mechanical embossing step is replaced by chemical embossing which is effected by adding a silicone oil to vinyl ink, printing a pattern on a PVC substrate with the siliconized ink, applying a fluid aromatic-hydroxyl functional polyester-isocyanate top coat over the PVC substrate, including the dry siliconized inked pattern and then curing the top coat in the presence of a tertiary amine. Where the siliconized vinyl ink is present, the coating is repelled or recedes from the siliconized ink and after curing the top coat gives an effect of embossing.

By the term polyvinyl chloride article or simply PVC article we mean articles which are made up of PVC resin alone or together with adjuvants for making PVC articles, e.g., such as the use of plasticizers for making flexible PVC film. The PVC articles which can be embossed are not limited as to size but preferred articles are films having a thickness of about 2 to 20 mils and particularly 4 to 12 mils. The invention can be used with flexible or rigid PVC articles.

The PVC resin used in making the PVC article will have a vinyl chloride unit content of at least 80% by weight, preferably at least 95% by weight and includes homopolymers of vinyl chloride, copolymers of vinyl chloride with ethylenically unsaturated monomers copolymerizable therewith and mixtures thereof. Homopolymers of PVC resin are preferred. Polyvinyl chloride resins prepared by emulsion polymerization, suspension polymerization, or bulk polymerization may be used in the present invention. The ethylenically unsaturated comonomers copolymerizable with vinyl chloride may be a variety of known compounds. Typical examples include olefinic compounds such as ethylene and propylene, vinyl esters such as vinyl acetate and vinyl propionate, unsaturated carboxylic acids and the esters or amide thereof such as acrylic acid, methacrylic acid, methyl acrylate, etc.

The PVC article can be made up of PVC resin alone or such resin together with conventional additives and compounding agents. Broadly, such article will contain from: about 50% to 80% of polyvinyl chloride (PVC) resin; from about 10% to 40% of plasticizer; and from about 10 to 30% of filler. Such articles can contain additional conventional compounding agents such as pigments, stabilizers, processing aids, mildewcides, and flame retardants. Generally, the quantity of PVC resin, plasticizer, and filler will comprise at least about 75% by weight of the article, e.g. , a sheet or film, and often at least about 90% by weight of said article. A preferred formulation for manufacture of flexible articles such as flexible sheets or films comprises from: about 52% to 70% of PVC resin; about 14% to 26% of plasticizer; about 1 to 3% of stabilizer; up to about 0.1% of processing aids; about 16% to 21% of filler; and about 8% to 20% of pigment.

Conventional plasticizers for PVC can be used in this invention. Illustrative of such plasticizers there can be mentioned: phthalic acid esters such as dibutyl phthalate, dioctyl phthalate, diisodecyl phthalate, diisoundecyl phthalate, etc.; trimellitic acid esters such as trioctyl trimellitate, tri-2-ethylhexyl trimellitate, tridecyl trimellitate, etc.; adipic acid esters such as dioctyl adipate, diisodecyl adipate, etc.; phosphoric acid esters such as tricresyl phosphate, trioctyl phosphate, etc; epoxy plasticizers and liquid polyesters. The preferred plasticizers are those of the phthalic acid esters and adipic acid esters, particularly those wherein each of the hydrocarbyl substituents on the phthalate or adipate are straight chain alkyl groups having at least 7 carbon atoms such as that of 7 to 11 carbon atoms. Illustrative of straight chain groups there can be mentioned those of n-heptyl, n-octyl, n-nonyl, n-decyl, and n-undecyl, e.q., such as with n-nonyl, n-nonyl phthalate. The quantity of plasticizer can vary over a broad range depending on the degree of rigidity or flexibility desired.

Conventional vinyl inks are used in this invention. Such inks are normally used for printing on vinyl surfaces and are commonly referred to simply as vinyl inks. Vinyl inks are made up of three ingredients. These are: a color pigment which is also referred to as a liquid dispersion colorant; a carrier which is a solvent; and a resinous binder. A supplier of suitable color pigments is Penn Color, Inc. of Doylstown Pa., e.g., moly orange color dispersion. The binder is generally that of an acrylic resin a PVC resin, or a combination of such acrylic polymer and PVC polymer. These inks are generally colored due to the pigment but clear vinyl ink, which does not contain color pigment is also operable in this invention. The color of the ink is unlimited in that it can be any color although for use in this invention blacks, browns and reds are generally used. vinyl inks are generally formulated for use on PVC. In certain cases, many of these vinyl inks have other utility as in printing upon other materials. Viscosities for the vinyl inks generally vary from about 15 to 40 seconds and preferably about 20 to 35 seconds as measured with a No 2 Zahn cup at 25° C.

Silicone oil is the surface tension conditioner used in this invention. Preferred silicone oils are cyclic and linear alkyl silicones such as dimethyl and diethyl silicones. Also operable are hydrolyzates derived from the reaction of halosilanes and water. Illustrative of silicone oils there can be mentioned SF-96 Series which is a poly(dimethyl)siloxane, of the General Electric Company; and UCAR L 9000 Series of Union Carbide Corporation. The silicone oil is dissolved in the vinyl ink and such silicone containing ink is referred to herein simply as siliconized ink. The range or quantity of silicone oil in the ink composition is narrow such as that of about 2.5% to 5% of the ink and dissolved silicone oil composition and preferably 3% to 4% by weight of such siliconized ink composition.

Apart from the narrow range of silicone oil in the ink, it was found that other surface tension reducing agents would not work in the compositions of this invention. Thus, as will be described hereafter, other surface tension reducing agents such as teflon, polyolefins, and various waxes were inoperable.

When the quantity of silicone oil in the ink composition is significantly less than about 2.5%, the quantity of such oil is insufficient to provide the needed surface tension reducing effect. When the quantity of the silicone oil is significantly greater than about 5%, the edges of the siliconized pattern are fuzzy and ragged and the pattern becomes blurred.

To obtain good wetting, i.e., maximum surface contact on the PVC substrate, the surface tension of the ink must be equal to or less than the critical surface tension of the PVC substrate. In other words, the carrier surface must have a higher degree of surface wetability than the ink composition. The top coat also must have a lower surface tension than the critical surface tension of the substrate, if the top coat is to wet the surface. Where the coating does not wet the surface, then it will recede away from that surface. The lack of a protective top coat on the embossed portions in this invention do not significantly affect the physical properties of the chemically embossed article.

There can be more than one color, image, or pattern of ink formed on the substrate. All of these need not be of a siliconized vinyl ink. Of course the patterns or images which do not contain the silicone oil will be overcoated with the top coat and the embossing will only take place over the siliconized ink.

Preferred patterns for use with this invention are various woodgrain patterns, particularly, that with lines and ticks. Other patterns or images include stripes, floral designs and the previously mentioned spanished type of images. The width of the lines or marks of the siliconized ink pattern should be sufficiently narrow so that after the fluid top coat is applied over the substrate, including the siliconized ink, the top coat will not wet or it will recede from over the siliconized ink on to the adjacent non-siliconized portions of the substrate.

The siliconized ink pattern is preferably applied by printing. Any type of printing is operable for use in this invention. Such printing can be gravure, offset, lithopress, silk screen, etc. In the case of flexible PVC film or sheets it is preferred that the printing be done by a gravure printing machine. In the gravure method, a series of metal rolls are each engraved with the pattern to be printed. The film itself is made by conventional techniques such as calendering or extrusion. Each roll is designed to apply a separate color. Line speeds of 20 to 100 yards per minute and more generally 40 to 50 yards per minute are conventional for gravure printing with the ink drying by evaporation. The printed PVC film with at least one of the inks containing silicone is then top coated with the fluid aromatic-hydroxyl functional polyester isocyanate top coat.

The top coats used in this invention are disclosed and claimed in U.S. Pat. No. 4,374,167 of Feb. 15, 1983 to J. Blegen; the parent divisional case of the 167 patent, namely U.S. Pat. No. 4,343,839 of Aug. 10, 1982 which claims methods for application of the top coat; U.S. Pat. No. 4,365,039 of Dec. 21, 1982 which is also a divisional patent based on U.S. Pat. No. 4,343,839 which claims curable coating compositions which form the cured coating of the 167 patent; and the polyesters of U.S. Pat. No. 4,368,222 of Jan. 11, 1983 to Blegen et al. As mentioned herein above, such top coats are referred to herein simply as aromatic-hydroxyl functional polyester-isocyanate top coats.

U.S. Pat. No. 4,374,167 is incorporated herein by reference, particularly columns 3–10 and claims 1–14. Claim 1 of the U.S. Pat. No. 4,374,167 patent is set forth below: 1. A composite article comprising a flexible substrate having an adherent cured film of a curable coating composition thereon, said film at a thickness of between about 0.1 and 0.5 mils possessing a flexibility sufficient for a O-T bend on metal and a mar resistance of at least about 2,000 gms as borne by the edge of a nickel passed over said cured film, said film being the cured residue of said coating composition after exposure to a vaporous tertiary amine catalyst, said coating composition comprising:

A. an aromatic hydroxyl functional condensation product having an acid number of less than about 10 and made by condensing the following ingredients in the indicated molar proportions or double thereof except for the phenolic-functional carboxylic acid:

(1) between about 1 and 2 moles of a $C_2$–$C_{12}$ linear aliphatic dibasic acid, (2) between about 1 and 2 moles of an ortho or meta aromatic dicarboxylic acid or anhydride thereof, (3) between about 1 and 4 mole of a $C_2$–$C_6$ alkylene glycol, (4) between about 1 and 2 moles of a sterically hindered diol, (5) between about 1 and 2 moles of a mono-epoxide or diol having a pendant $C_8$–$C_{22}$ hydrocarbyl group, and (6) between about 1 and 2 moles of a phenolic-functional carboxylic acid;

B. a multi-isocyanate comprising:

(1) between about 10 and 80 percent by weight of an aromatic multi-isocyanate, and (2) between about 90 and 20 percent by weight of an aliphatic multi-isocyanate;

C. a volatile organic solvent for such condensation product and for said multi-isocyanate, and D. a mar-resisting agent of an organic compound physically incompatible in said coating composition and having an effective chain length of at least about 12 carbon atoms;

the ratio of aromatic hydroxyl equivalents to said condensation product to the isocyanate equivalents of said multi-isocyanate being between about 1:1 and 1:1.7, said condensation product containing substantially no aliphatic hydroxyl groups, and said condensation product having a phenol functionality of at least 2.

Also incorporated herein by reference is U.S. Pat. No. 4,343,839 of Aug. 10, 1982 to J. Blegen, particularly columns 3–10 and the claims thereof. This is the parent patent of the above mentioned U.S. Pat. Nos. 4,365,039 and 4,374,167. Claim 1 of this U.S. Pat. No. 4,343,839 patent is set forth below:

1. A method for coating a flexible substrate with a coating composition which comprises:

(I) applying said coating composition to said flexible substrate, said coating composition having a pot life of a least about 4 hours in an open pot and comprising:

A. an aromatic hydroxyl-functional condensation product having an acid number of less than about 10, having an aromatic hydroxyl-functionality of at least 2, and containing substantially no aliphatic hydroxyl groups, said condensation product made by condensing the following ingredients in the indicated molar proportions or double thereof except for the phenol-functional carboxylic acid:

(1) between about 3 and 8 moles of a mixture of diols which include a sterically hindered diol, and a diol or mono-epoxide which provides a pendant $C_8$–$C_{22}$ hydrocarbyl group; and (2) between about 3 and 6 moles of a mixture of a linear aliphatic dibasic acid and an ortho or meta aromatic dicarboxylic acid, and a phenol-functional carboxylic acid having at least one carbon atom between said phenol group and said carboxyl group;

(B) a multi-isocyanate cross-linking agent comprising a mixture of aromatic and aliphatic multi-isocyanate, wherein the ratio of aromatic hydroxyl equivalents from said condensation product to the isocyanate equivalent of said multi-isocyanate agent ranges from between about 1:1 and 1:1.7;

(C) a volatile organic solvent for said condensation product and for said multi-isocyanate; and (D) a mar-resisting agent of an organic long chain fatty compound physically incompatible in said coating composition and having an effective chain length of at least 12 carbon atoms; and (II) exposing said coated flexible substrate to a vaporous tertiary amine catalyst to rapidly cure said coating at about room temperature; said cured coating having a film thickness of between about 0.1 and about 0.5 mils; said cured film of said coating composition possessing a flexibility sufficient for a zero-T bend on metal and a mar resistance of at least about 2,000 grams as borne by the edge of a nickel passed over said cured film.

Portions of particular interest in said 839 patent are columns 2–10 and the claims.

Also, incorporated herein by reference, is U.S. Pat. No. 4,368,222 of Jan. 11.1983 to Blegen et al. particularly those portions dealing with aromatic-hydroxyl functional polyesters and claims 1–3 5 and 11. Claim 1 of this Blegen et al patent is set forth below:

1. In a method for coating a surface-porous substrate of a fibrous reinforced molding compound with a film of a curable primer coating composition and curing said film, the improvement which comprises:

(A) applying said film of said coating composition to said substrate, said coating composition comprising:

(1) an aromatic-hydroxyl functional compound; and (2) a multi-isocyanate curing agent; and (B) exposing said coated substrate to a vaporous tertiary amine catalyst to rapidly cure said applied film at room temperature, said vaporous catalyst cured film being substantially free of surface imperfections.

The process for coating the aromatic-hydroxyl functional polyester isocyanate top coat on the PVC and subsequently exposing the coating to the vapourous teriary amine catalyst to cure the coating is broadly described herein as well as in the patents incorporated hereing by reference. Broadly this involves applying a thin coating of the top coat onto a PVC film which has a printed pattern of siliconized ink and subsequently exposing the coating to the amine catalyst. Thus, a roll of film is placed on the unwind stand. It is attached to a leader that is threaded through the machine. The machine is engaged and the film unrolls, passing through a coating nip (gravure coating station) where coating is applied. Then the substrate is picked up on a conveyer belt and passes through a curing chamber.

In the curing chamber, the coating undergoes crosslinking with a vapor cure system using TEA (triethylamine) as the catalyst. TEA is vaporized in an apparatus called the TEA geerator. This is done by bubbling nitrogen gas through liquid TEA. The nitrogen containing TEA is then pumped into the chamber. The flow is regulated by a pressure controller which maintains constant pressure on the system. TEA and oxygen analyzers are used to continyously monitor TEA and oxygen levels in the chamber. The chamber has gates located at the entrance and exit of the chamber to prevent air infiltration.

Exhaust from the system is vented through a TEA scrubber. The scrubber absorbs and neutralizes the TEA present in the exhaust gases. After passing through the curing chamber, the cross-linking is complete. The coated substrate then enters the flash oven. In the oven, the solvents used in the curing are driven off using moderately elevated temperatures. At the end of the flash off oven, the coating is dry. The substrate then passes out of the oven and is wound up in a roll at the wind-up station.

In order that those skilled in the art may more fully understand the invention presented herein, the following examples are set forth. All parts and percentages in the examples, as well as elsewhere in this application, are by weight, unless otherwise specifically stated.

EXAMPLE 1

Compatibility Testing of Different Combinations of Surface Tension Reducing Agents, Protective Top Coats, and Inks Combinations of various surface tension reducing agents as shown in Table 1A and protective top coats as shown in Table 1B were tested for operability for chemically embossing on PVC film. The procedure employed was as follows. A surface tension reducing agent of Table 1A was dissolved in each of VC-154 and VC-178 vinyl ink. VC-154 is a conventional vinyl ink composed of 77% methyl ethyl keytone (MEK) and 23% resin binder in which 10 g of brown pigment from Penn Color Inc. has been added. VC 178 is another conventional vinyl ink composed of 71% MEK, 22% resin binder and 7% wax coated silica to which a small quantity of pigment from Penn Color, Inc. has been added.

The concentration of the surface tension reducing agent varied by 0.5% increments starting from 0.5% by weight of the ink plus the surface tension reducing agent and ending at 5% by weight of such siliconized ink and surface tension reducing agent solution. A glass rod was then dipped into each of the solutions and a line was drawn on a PVC film. The solution was then permitted to dry. Then the various topcoats were coated over the film and dried ink solution. This was done for all the surface tension reducing agents and inks. The same was done with all of the protective top coats. Observations were then made to determine which combinations produced chemical embossing on the PVC film.

At the conclusion of the tests it was determined that the only combinations which produced the chemical embossing were that of the silicone oils in combination with vinyl inks, and the topcoats designated as MR-4, MR-5, and MR-9 of Table 1B. The top coats are liquids and MR-4 is illustrative of such top coats. MR-4 top coat is made by mixing 155 pounds of VPC 1022 System Part A Code R-272 which is a polyester resin formulation of Ashland Chemical, Inc. with 75 pounds of VCP 1030 R Coat System Part B which is a multi-isocyanate curing agent of Ashland Chemical, Inc. and sufficient isopropyl acetate solvent (about 5 pounds) to obtain a 53% solids mixture having a No. 2 Zahn cup viscosity of 22–24 seconds. The VPC 1022 and VPC 1030 R are polyester and multi-isocyanate ingredients which make up aromatic-hydroxyl functional polyester-isocyanate top coats as described hereinbefore. The MR-4, MR-5, and MR-9 top coats are covered by the claims of U.S. Pat. No. 4,374,167 which has been mentioned hereinbefore.

TABLE 1A

SURFACE TENSION REDUCING AGENTS

| COMPANY NAME | GENERIC NAME | TRADE NAME |
|---|---|---|
| General Electric | Silicone Oil | SF-96 Series* |
| Union Carbide | Silicone Oil | L 9000 Series* |
| General Electric | Silicone Oil | 554191B |
| Dupont | Teflon | Ch-7066S |
| Carroll Scientific, Inc. | Teflon | MP1100 |
| Daniel Products | Polyolefin | SL-600 |
| Daniel Products | Wax | SL-417 |
| Daniel Products | Wax | SL-640 |
| Daniel Products | Wax | SL-404 |
| Daniel Products | Wax | SL-92 |
| Daniel Products | Wax | SL-425 |
| Daniel Products | Wax | SL-417 |
| Daniel Products | Wax | SL-92 |
| Daniel Products | Wax | SL-92 |
| Daniel Products | Wax | SL-404 |
| Daniel Products | Wax | SL-18 |
| Daniel Products | Wax | SL-133 |

* Both the Union Carbide Series and the General Electric Series have products having viscosity which ranges from 5 to 1000 cps at 25° C.

TABLE 1B

PROTECTIVE TOP COATS

| COMPANY NAME | PRODUCT |
|---|---|
| Ashland Chemical Company | MR-5 |
| Ashland Chemical Company | MR-4 |
| Columbus Coated Fabrics Company of Borden Inc. | VC-228 or VC-111 |
| Columbus Coated Fabrics Company of Borden, Inc. | VC-137 |
| Colunbus Coated Fabrics Company of Borden, Inc. | VC-139 |
| Sanncor Coatings Company | WC-104 or WC-105 |
| Sanncor Coatings Company | WC-106 |
| Ashland Chemical Company | MR-9 |

In the above Table 1B: the Ashland Chemical Company products are aromatic-hydroxyl functional polyester-isocyanate top coats; those of Columbus Coated Fabrics Company are vinyl-acrylic; whereas those of Sanncor Coatings Company are water borne urethanes.

EXAMPLE 2

Concentration of Silicone Oil in Ink

In this example, different concentrations of silicone oil were added to a black vinyl ink. The procedure of Example 1 was used to test the ink composition. Samples were made up of different concentrations of silicone oil in the ink as shown in Table 2 and tested on PVC film. The ink compositions as well as the results obtained are shown in Table 2. It can be seen that the "good" results are within a narrow range of concentration.

TABLE 2

| Composition | T1 | T2 | T3 | T4 | T5 | T6 |
|---|---|---|---|---|---|---|
| VC-178 | 90 | 90 | 90 | 90 | 90 | 90 |
| R-448 | 10 | 10 | 10 | 10 | 10 | 10 |
| R-551 | 60 + 40 | 60 + 40 | 60 + 40 | 60 + 100 | 60 + 100 | 60 + 100 |
| SF-96 Series | 1.6 | 3.2 | 6.4 | 9.6 | 12.8 | 16 |
| TOTAL GMS. | 201.6 | 203.2 | 206.4 | 269.6 | 272.8 | 276 |
| % Silicone Oil | 0.8% | 1.6% | 3.1% | 3.5% | 4.7% | 5.8% |
| Emboss Effect | None | Little | Good | Good | Marginal | Bad |

The quantities set forth for: VC-178; R-448; and R-551 are set forth in grams (g or gms.)

VC-178 is a vinyl ink carrier made up of 71% MEK, 22% resin, and 7% of wax coated silica.

R-448 is a black color pigment.

R-551 is methyl isobutyl ketone (MIKB).

EXAMPLE 3

Surface Tension

This example was performed to determine surface tension of a PVC film and coatings used in this invention. The article or substrates which were tested as well as their surface tension is shown in Table 3.

TABLE 3

| SURFACE TENSIONS | |
|---|---|
| Material | Dynes |
| 1. A wood grain PVC base film | 35 |
| 2. PVC film coated with VC-154 | 36–37 |
| 3. PVC film coated with ink + 3% SF-96-5 | <30 |
| 4. Uncoated black PVC (back) | 36 |
| 5. Uncoated face PVC (embossed) | >40 |

The PVC film was made up of from: about 52% to 70% of PVC resin, 14% to 26% plasticizer, 1% to 3% of stabilizer; 0% to 0.1% of processing aid; about 16% to 21% of filler; and about 10% to 20% of pigment. The SF-96-5 ingredient is a silicone oil of the SF-96 Series having a viscosity of 5 cps at 25° C.

EXAMPLE 4

Surface Tension

This example was performed to determine surface tension of various raw materials used in this invention. The results of this example are shown in Table 4.

TABLE 4

| SURFACE TENSION OF RAW MATERIALS | |
|---|---|
| | DYNES |
| Mildewcide | 35.6 |
| Epoxidized Soybean Oil | 41.5 |
| Sanitizer 711 | 33.5 |
| DOP (Dioctyl phthalate) | 35.1 |
| Polymeric Platicizer (low molecular weight) | 39.0 |
| Sanitizer 141 | 35.1 |
| Polymeric Plasticizer (medium molecular weight) | 39.0 |
| DINP | 33.9 |
| Ba/Ca/Zinc stabilizer | 32.4 |
| Ba/Zinc stabilizer | 31.9 |
| SF-96-5 (Silicone Oil) | 22.1 |
| VC-154 + Black pigment + 7% SF-96-5 | 26.0 |
| VC-178 + Black pigment + 7% SF-96-5 | 26.2 |
| VC-154 + Black pigment + 3.7% SF-96-5 | 27.0 |
| VC-178 + Black pigment + 3.7% SF-96-5 | 27.5 |

Sanitizer 711 is a plasticizer manufactured by Monsanto Chemical Company.

Polymeric Plasticizer is a series of plasticizers manufactured by Huls America, Inc.

DINP is a plasticizer manufactured by Exxon Chemical Company.

VC-154 is a mixture of 77% MEK and 23% binder resin.

VC-178 is a mixture of 71% MEK, 22% resin and 7% wax coated silica.

EXAMPLE 5

Surface Tension of Top Coats

This example was performed to determine surface tensions of top coats used in this invention. The results of this example are shown in Table 5.

TABLE 5

| SURFACE TENSION OF TOP COATS | |
|---|---|
| MR-4 | 27.3 |
| MR-5 | 27.3 |
| MR-9 | 27.3 |

EXAMPLE 6

Preparation of Chemically Embossed Article

In a preferred process, a base PVC film is calendered to a 4 mil thickness. The PVC film containes, by weight, 54% PVC resin, 14% plasticizer, 0.2% stabilizer, 1.0% processing aids, 22% of calcium carbonate filler, and 9.8% of pigment. The PVC film is printed with three different colors of ink, namely, light brown, medium brown, and dark brown to form an oak wood grain pattern. Each of the light brown and medium brown inks contains 7.5% of pigment, 42.5% of resin and 50 % of solvent which is a mixture of methyl ethyl ketone (MEK) and methyl isobutyl ketone (MIBK). The dark brown ink contained 4.8% of pigment, 41.1% of resin, 48.3% of solvent which was a mixture of methyl ethyl ketone and isobutyl ketone, and 3.7% of silicone oil. The resin in the inks was made of 60% to 85% of PVC resin and 15% to 40% of poly (methyl methacrylate). The ink is dried on the base film. An aromatic-hydroxyl functional polyester-isocyanate top coat is then applied to the inked film and eventually cured as set forth herein and the Begen patents hereinabove mentioned. The top coat will cover the surface of the base film as will as the light brown and medium brown ink. However, the top coat will not cover the dark brown ink and will leave depressed areas thereover evidencing the chemical embossing.

What is claimed is:

1. A chemically embossed polyvinyl chloride article comprising:

A. a cured top coat film derived from a fluid, curable coating composition in contact with the polyvinyl chloride and forming a coating thereover, said film being the cured residue of said coating composition after exposure to vaporous tertiary amine catalyst, said coating composition comprising an aromatic-hydroxyl functional polyester and a curing agent comprising a multi-ioscyanate; and B. a vinyl ink composition pattern of lines or ticks in contact with said polyvinyl chloride and forming a pattern thereover said vinyl ink composition containing from about 2.5% to 5% of silicone oil by weight of the composition and wherein the pattern is free from having the top coat thereover.

2. The article of claim 1 wherein the molar ratio of aromatic-hydroxyl groups to isocyanate groups is between about 1:1 and 1:2.

3. The article of claim 2 wherein the aromatic-hydroxyl functional polymer is substantially free of reactive aliphatic hydroxyl groups.

4. The article of claim 3 wherein the quantity of silicone oil in the vinyl ink composition is from about 3% to 4% by weight of the vinyl ink composition.

5. The article of claim 2 wherein the polyvinyl chloride article is a flexible sheet comprising from: about 53% to 70% of polyvinyl chloride resin; about 14% to 26% of a plasticizer; about 16% to 21% of a filler; and about 10% to 20% of pigment.

6. The article of claim 5 having an additional vinyl ink pattern thereon which does not contain an amount of silicone oil for providing a concave pattern in the top coat whereby the top coat overlies said additional pattern.

7. A composite article comprising a flexible polyvinyl chloride substrate having an embossed pattern formed by concaved sides of an adherent cured film of a curable coating composition thereover in contact with said substrate, said film being the cured residue of said coating composition after exposure to a vaporous tertiary amine catalyst, wherein:

A. said coating composition comprises:
  (a). an aromatic hydroxyl functional condensation product having an acid number of less than about 10 and made by condensing the following ingredients in the indicated molar proportions or double thereof except for the phenolic-functional carboxylic acid:
    (1) between about 1 and 2 moles of a $C_2$–$C_{12}$ linear aliphatic dibasic acid,
    (2) between about 1 and 2 moles of an ortho or meta aromatic dicarboxylic acid or anhydride thereof,
    (3) between about 1 and 4 mole of a $C_2$–$C_6$ alkylene glycol,
    (4) between about 1 and 2 moles of a sterically hindered diol,
    (5) between about 1 and 2 moles of a mono-epoxide or diol having a pendant $C_8$–$C_{22}$ hydrocarbyl group, and
    (6) between about 1 and 2 moles of a phenolic-functional carboxylic acid;
  (b). a multi-isocyanate comprising:
    (1) between about 10 and 80 percent by weight of an aromatic multi-isocyanate, and
    (2) between about 90 and 20 percent by weight of an aliphatic multi-isocyanate;
  (c). a volatile organic solvent for such condensation product and for said multi-isocyanate, and
  (d). a mar-resisting agent of an organic compound physically incompatible in said coating composition and having an effective chain length of at least about 12 carbon atoms;
the ratio of aromatic hydroxyl equivalents to said condensation product to the isocyanate equivalents of said multi-isocyanate being between about 1:1 and 1:1.7, said condensation product containing substantially no aliphatic hydroxyl groups, and said condensation product having a phenol functionality of at least 2; and B. wherein the embossing is formed over a printed pattern of a composition of vinyl ink and silicone oil containing 2.5% to 5% by weight of silicone oil, said pattern being in direct contact with the substrate the embossing being in registry with said silicone containing vinyl ink and wherein the cured film does not extend over the embossing.

8. The article of claim 7 wherein the engraved pattern is formed by lines and ticks.

9. The article of claim 7 wherein the substrate is that of polyvinyl chloride film and said condensation product is made by condensing:
  (1) between 1 and 2 moles of adipic acid,
  (2) between 1 and 2 moles of isophthalic acid,
  (3) between 1 and 4 mole of propylene glycol,
  (4) between 1 and 2 moles of neopentyl glycol,
  (5) between 1 and 2 moles of an epoxy-ester having pendant hydrocarbyl groups, and
  (6) between 1 and 2 moles of a diphenolic-type acid.

10. A composite article of claim 7 wherein the siliconized ink and the curable coating composition have about the same surface tension.

11. The article of claim 9 wherein said adherent cured film at a thickness of between about 0.1 and 0.5 mil possesses a flexibility sufficient to a O-T bend on metal and a mar resistance of at least about 2000 g as borne by the edge of a nickel passed over said cured film.

12. The article of claim 7 having an additional vinyl ink pattern in thereon which contains less than 2.5% of the silicone oil and the top coat overlies said additional pattern.

13. A composite article comprising:
A. a flexible polyvinyl chloride substrate;
B. a wood grain pattern of vinyl ink composition containing from about 2.5% to 5% of silicone oil by weight of the composition;
C. a cured top coat film derived from a fluid, curable coating composition in contact with the entire substrate which is free of the ink composition and wherein the area over the composition is free of the top coat and provides a depression over the composition in relation to the remaining article, said film being the cured residue of said coating composition after exposure to vaporous tertiary amine catalyst, said coating composition comprising an aromatic-hydroxyl functional polyester and a curing agent comprising a multi-isocyanate.

14. The article of claim 13 having an additional vinyl ink composition therein in contact with the polyvinyl chloride substrate, said additional composition containing less than 2.5% of silicone oil and wherein the top coat overlies the additional pattern.

* * * * *